United States Patent
Armanini (10) Patent No.: US 10,767,330 B2
(45) Date of Patent: Sep. 8, 2020

(54) STREAM DEBRIS RESTRAINING STRUCTURE

(71) Applicant: Aronne Armanini, Trento (IT)

(72) Inventor: Aronne Armanini, Trento (IT)

(73) Assignee: OFFICINE MACCAFERRI S.P.A., Bologna (IT)

( * ) Notice: Subject to any disclaimer, the term of this patent is extended or adjusted under 35 U.S.C. 154(b) by 0 days.

(21) Appl. No.: 16/045,124

(22) Filed: Jul. 25, 2018

(65) Prior Publication Data

US 2019/0055707 A1    Feb. 21, 2019

Related U.S. Application Data

(63) Continuation of application No. 14/776,339, filed as application No. PCT/IB2014/059684 on Mar. 12, 2014, now abandoned.

(30) Foreign Application Priority Data

Mar. 15, 2013 (IT) .............................. TO2013A0200

(51) Int. Cl.
     *E02B 8/02*      (2006.01)
     *E02B 5/08*      (2006.01)
     *E02B 3/02*      (2006.01)

(52) U.S. Cl.
CPC .............. *E02B 5/085* (2013.01); *E02B 3/023* (2013.01); *E02B 8/023* (2013.01); *Y02A 10/28* (2018.01)

(58) Field of Classification Search
CPC . E02B 3/023; E02B 5/085; E02B 8/02; E02B 8/023

USPC ......... 210/747.5, 162, 170.1; 405/60, 63, 65
See application file for complete search history.

(56) References Cited

U.S. PATENT DOCUMENTS

| | | | |
|---|---|---|---|
| 1,584,766 A | 5/1926 | Gordon et al. |
| 4,738,563 A | 4/1988 | Clark |
| 6,576,141 B2 | 6/2003 | Turner, Jr. et al. |
| 2004/0115003 A1 | 6/2004 | Johnston |
| 2009/0022549 A1 | 1/2009 | Wartmann |
| 2011/0305517 A1 | 12/2011 | Borries |
| 2013/0078037 A1 | 3/2013 | Chen et al. |
| 2016/0032547 A1 | 2/2016 | Armanini |

FOREIGN PATENT DOCUMENTS

| | | |
|---|---|---|
| AT | 502680 A4 | 5/2007 |
| CH | 480506 A | 10/1969 |
| DE | 1 941 076 A1 | 3/1970 |
| DE | 29618691 U1 | 3/1997 |
| DE | 20300821 U1 | 5/2003 |
| EP | 2971368 B1 | 1/2016 |

(Continued)

OTHER PUBLICATIONS

"Rational Criterion for Designing Opening of Slit-Check Dam", by Aronne Armanini and Michele Larcher, Journal of Hydraulic Engineering, Feb. 2001, pp. 94-104.

(Continued)

*Primary Examiner* — Christopher Upton
(74) *Attorney, Agent, or Firm* — Flynn Thiel, P.C.

(57) ABSTRACT

A structure for restraining debris in a stream, including lateral walls, which delimit between them a flow section in a bed of the stream. This flow section includes an upper portion that includes set between the lateral walls, a structure for retaining material arriving from upstream, and a lower portion that identifies an opening for outflow.

15 Claims, 9 Drawing Sheets

(56) References Cited

FOREIGN PATENT DOCUMENTS

| | | |
|---|---|---|
| FR | 1 115 084 | 4/1956 |
| FR | 2 675 828 A1 | 10/1992 |
| JP | S53105339 U | 8/1978 |
| JP | 61-38010 A | 2/1986 |
| JP | H03-036021 U1 | 4/1991 |
| JP | H07-292642 | 11/1995 |
| JP | H09273137 A | 10/1997 |
| JP | H1150435 A | 2/1999 |
| JP | 2001262544 A | 9/2001 |
| JP | 2001303538 A | 10/2001 |
| JP | 2004-300874 A | 10/2004 |
| JP | 2004316081 A | 11/2004 |
| JP | 2005-201019 A | 7/2005 |
| JP | 2006-274576 A | 10/2006 |
| JP | 2001303538 A | 12/2006 |
| JP | 2007-191936 A | 8/2007 |
| JP | 2009-074355 A | 4/2009 |
| JP | 5080373 B2 | 12/2009 |
| KR | 20080003416 U | 8/2008 |
| WO | WO 2004/071962 A1 | 8/2004 |
| WO | WO 2011/153956 A1 | 12/2011 |
| WO | WO 2012/040517 A2 | 3/2012 |

OTHER PUBLICATIONS

"142: Debris Flow", by Aronne Armanini, Luigi Fraccarollo and Michele Larcher, Encyclopedia of Hydrological Sciences, 2005, pp. 2173-2185.
International Search Report issued in Application No. PCT/IB2014/059684 dated Jun. 13, 2014 (3 pages).
"Hangmuren—und Murgangschutz", Schlucher Rüfe, Li (3 pages) ("Anlage 47").
Notice of Opposition corresponding to European Patent No. 2 971 368 B1; European Application No. 14719086.2, dated Oct. 28, 2019 (172 pages).
"Murgangsperre Schlucherrüfe, Malbun Verankerung des Geschieberückhaltenetzes", Stephan Wohlwend, Eberhard Gröner and Arnold Keller, dated Nov. 29, 2006 (4 pages) ("Anlage 48").
Screenshot of a Youtube video, Murgangschutz: Wenn Bäche zu reissenden Fluten werden; website: https://www.youtube.com/watch?v=QoW7CGstO_8 (1 page) ("Anlage 50").
Article titled "Die Behörden hatten einfach Schwein", BZ Berner Zeitung, dated Jun. 19, 2012 (4 pages) ("Anlage 51").
Screenshot from Google.com, Thönishaus "Die Behörden hatten einfach Schwein"; Berner Zeitung (1 page) ("Anlage 52").
Article tiled "Scherlibach: Neuer Holfang gegen Hochwasser"; BZ Berner Oberländer dated Feb. 11, 2016 (4 pages) ("Anlage 53") .
"Hangmuren—und Murgangschutz"; Hüpbach, Kanton Bern, CH; Geobrugg (5 pages) ("Anlage 54").
"Murgangsperre" Hüpach, Oberwil, BE; Geotechnisches Institut AG (1 page) ("Anlage 55").
"Murgangsperre Hüpach", Emch+Berger (5 pages) ("Anlage 56").
Article titled "Bauen unter Extrembedingungen", Wasserbau: Mugangsperre Hüpbach; Kästli Bau AG, dated Mar. 2017 (4 pages) ("Anlage 57").
Screenshots of a Youtube video; titled "Biggest debris flow barrier worldwide" Geobrugg, dated Mar. 28, 2018 https://www.youtube.com/watch?v=xm9C66490Pg (4 pages) ("Anlage 58").
"Schutzsysteme zum Rückhalt von Murgang, Geschiebe, Schwemmholz und Schneerutsch", Geobrugg, dated May 2012 (28 pages) ("Anlage 59").
"Hangmuren—und Murgangschultz"; Schwemmholzbarriere, AT, Geobrugg (4 pages) ("Anlage 60").
Product Manual; "VX/UX Debris Flow Barriers", Geobrugg AG, dated Jul. 11, 2016 (37 pages) ("Anlage 61").
"Debris Flow & Shallow Landslide Protection"; Galera, ES, Geobrugg (4 pages) ("Anlage 62").
Article titled "Flexible Murgangbarrieren"; Bemessung und Verwendung; Axel Volkwein; WSL Berichte (ISSN 2296-3456) dated 2014 (31 pages) ("Anlage 63").
Article titled "Merligen bald vor Murgängen geschützt", BZ Berner Zeitung, dated Feb. 8, 2012 (5 pages) ("Anlage 64").
Murgangsperre Grönbach, Merligen, Emch+Berger Gruppe (1 page) ("Anlage 66").
Rubrik: News Gemeinde; Jahresziele 2011 GR Sigriswil (3 pages) ("Anlage 67").
Leitfaden "Öffentlichkeit und Information in den Gemeinden" (7 pages) ("Anlage 68").
Article titled "Geschiebesammler Gryfenbach Vergrösserung Rückhaltevolumen", Flussbau AG, dated Dec. 2013 (19 pages) ("Anlage 69").
Fotos—Rund um die neuve Geschiebesperre im Rimsgrund—bezaubernde.info (4 pages) ("Anlage 70").
Photograph of WLV 2009 (1 page) ("Anlage 71").
Screenshot of a website showing a structure, dated Nov. 11, 2011 (1 page) ("Anlage 72").
Publication; "Murgangrückhalt in Wildbächen—Grundlagen zu Planung und Berechnung von flexiblen Barrieren, Corinna Simone Isabelle Wendeler", Dissertation ETH Nr. 17916, dated 2008 (293 pages) ("Anlage 73").
Leaflet essay titled "Über Offene Wildbachsperren", (open torrent barriers), Gottfried Kronfellner—Kraus (70 pages) ("Anlage 74").
Publication titled "Schutzbauwerke gegen Wildbachgefhren", Grundlagen, Entwurf und Bemessung, ( Protective structures against torrent hazards), Beispiele, Konrad Bergmeister, Jürgen Suda, Johannes Hübl and Florian Rudolf-Miklau, Ernst & Sohn (223 pages) ("Anlage 75"), dated 2009.
Photo of a wire barrier (1 page) ("Anlage 49").

STREAM DEBRIS RESTRAINING STRUCTURE

CROSS REFERENCE TO RELATED APPLICATIONS

This is a continuation of prior U.S. application Ser. No. 14/776,339, filed Sep. 14, 2015, which was the National Stage of International Application No. PCT/IB2014/059684, filed Mar. 12, 2014.

FIELD OF THE INVENTION

The present invention relates to a stream debris-restraining structure.

Reference is made herein in particular, but not exclusively, to debris-restraining structures (check dams) that are to be built along watercourses in the presence of considerable solid transport (debris flows, mudflows, and hyper-concentrated streams) and/or of large-sized floating vegetal material.

General Technical Problem

The structures that are provided for restraining debris in streams are usually check dams, i.e., works of hydraulic engineering that are set across the channel of a watercourse, in which they are founded and are designed to reduce the bedload transport by the aforesaid watercourse, whether this be a torrent or a river, by creating a deposit of sediments or solids upstream thereof.

Classic check dams may be built of masonry, earth, timber, and gabions, i.e., metal containers filled with riprap, such as pebbles and stones.

The above check dams are constituted by a wall with a generally trapezoidal cross section having an upstream face that is frequently vertical, and a foundation (set underground) in the bed and in the banks, the wall being toothed into the banks. The flow section is also known as "weir", is generally trapezoidal, and is located in the central part of the engineering work. Instead, the parts of the wall that from the weir extend as far as the banks are referred to as "wings". These wings generally have a slight inclination, for example 10°. The task of the weir is to contain the watercourse in the normal conditions of flow, thus preventing the current from possibly eroding the banks of the engineering work or possibly circumventing it. The primary purpose of a classic check dam is to correct the natural slope of the bed in which it is built, once it is silted, i.e., once, upstream thereof, the space available is completely occupied by the transported solid material arriving from upstream.

Also known are selective check dams that are made in a way similar to classic check dams, but have the task, not of correcting the slope of the bed in which they are inserted, but rather of withholding the material of coarser particle size arriving from upstream when the watercourse is in high-flow or flood conditions. To fulfill this function, the weir is replaced by a flow section, or opening, the dimensions of which depend upon the particle size of the material that is to be restrained. The opening may be made in various ways; it may be constituted by a simple slit, or else by a (horizontal or vertical) steel grid.

It is known to use as selective weirs, ringnet or wiremesh catch fences, i.e., elastic barriers constituted by nets or meshes of metal rings, which enable flow of the water. For example, the firm Geobrugg produces fence barriers for protection against debris flows that have a wing-like arrangement of top supporting ropes that determines a clearly defined flow section.

The aforesaid ringnet barriers function according to the criterion of a mechanical sieve and present the drawback of filling up completely in the initial flood phase of the stream and hence not exerting lamination during the flood peak.

The object of the present invention is to overcome the drawbacks of the prior art and in particular to indicate a stream debris-restraining structure that does not fill up completely in the initial flood phase of the stream and thus exerts lamination during the flood peak.

The object of the present invention is achieved by a structure having the characteristics forming the subject of the ensuing claims, which form an integral part of the technical teaching provided herein in relation to the invention. The object of the invention is also a corresponding method for restraining debris in streams.

BRIEF DESCRIPTION OF THE DRAWINGS

The invention will now be described with reference to the annexed plates of drawings, which are provided purely by way of non-limiting example and in which.

DETAILED DESCRIPTION OF THE INVENTION

In brief, structures are proposed herein that are configured for enabling passage of the solid discharge during the initial phase and final phase of the flood wave and are able to restrain the material during the flood peak, exerting an effect of lamination of the solid discharge, thus reducing the flood-peak value; i.e., the mechanism of interception of the solid material is of a hydrodynamic nature and not of a mechanical-sieve type.

In particular, the structure according to the invention is constituted by a check dam with horizontal slit. The aforesaid horizontal slit is located at the bottom of the check dam, i.e., in the lower portion of the flow section. More specifically, the flow section is substantially trapezoidal, is delimited in its horizontal extension by lateral walls, and comprises an upper portion and a lower portion. The upper portion of the flow section comprises a structure for retaining the material arriving from upstream, which is in particular configured for intercepting the material in high-flow or flood conditions of the steam and extends horizontally between the lateral walls. In particular, according to a preferred version of the invention, the aforesaid retaining structure is advantageously constituted by a net, made of wire mesh or of elastic rings or obtained with ropes, and is not built as a full wall. The lower portion of the flow section corresponds to the horizontal slit and vertically extends between the bottom edge of the retaining structure and the bed of the watercourse or a slab that covers the aforesaid bed. The height of the aforesaid horizontal slit with respect to the bed or to the slab is sized for performing the action of retention as a function of the deposit that it is intended to obtain upstream and of the hydrodynamic characteristics and of the sediment transport of the current, according to the method described in detail hereinafter, with reference to FIGS. 7, 8, 9, and 10.

Advantageously, the hydraulic restraining structure according to the invention involves costs and times of construction that are lower than those of a check dam made altogether of concrete. It differs from woven-wire check dams and ringnet check dams precisely on account of the presence of the bottom opening, or lower part of the flow section, which has the purpose of:
- allowing passage of the initial part of the solid discharge, bestowing upon an array of these structures built in succession along the watercourse, an effective lamination capacity;
- enabling a greater capacity of self-cleaning (which is absent in traditional net check dams) as compared to rigid vertical-slit check dams; in fact, the horizontal opening considerably reduces the possibility of clogging; and
- cutting the construction costs and times.

According to the particular lamination requirement, the horizontal slit may occupy the entire width of the bed or channel or else just a part of it (partial-width opening).

The rigid part of the check dam may be built of reinforced concrete, box-shaped gabions, and steel beams.

The flow section of the check dam may be built of concrete, either cladded or not with steel, or else of firmly bound boulders or rocks.

In what follows, represented in FIGS. 1, 2, and 3 are check dams in which the horizontal slit occupies the full width of the bed, whereas represented in FIGS. 4, 5, and 6 are partial-width check dams, in which the horizontal slit occupies just a part of the bed.

Represented in FIG. 1 is a check-dam restraining structure 10 with full-width horizontal slit and wire mesh.

Figure 1A:
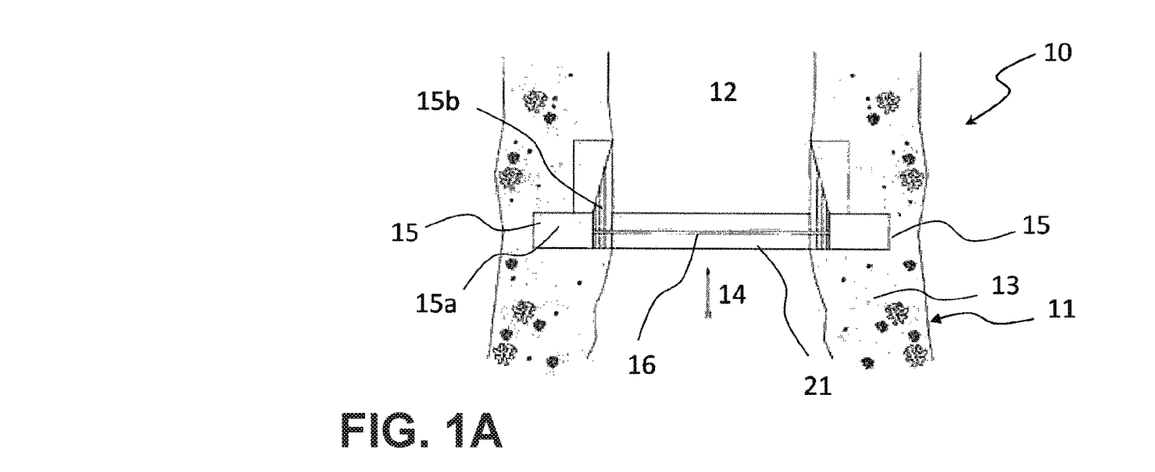
FIGS. 1a, 1b, and 1c are schematic illustrations, viz., a top plan view, a front view, and a cross-sectional view, respectively, of a first embodiment of the stream debris-restraining structure according to the invention.
Figure 1B:
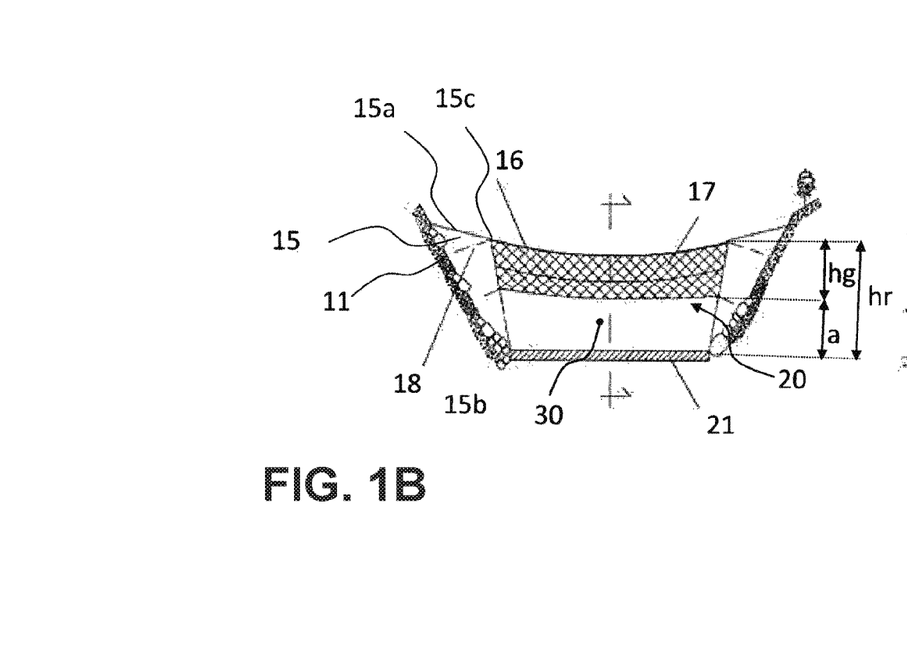
Figure 1C:
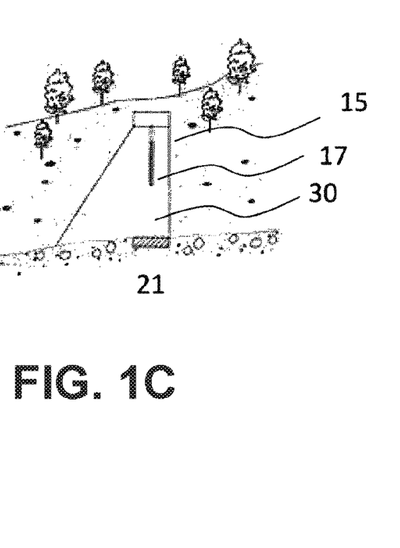

Appearing in particular in FIG. 1*a* is a top plan view of the bed 12 of a watercourse 11. Designated by the reference number 13 are banks of the watercourse 11. An arrow 14 indicates the flow of water and its corresponding direction. The check-dam structure 10 comprises lateral walls 15 with a trapezoidal cross section and with vertical upstream face, that extend as far as the limit of the bed 12 and define between them a trapezoidal weir 20, where the minor side of the trapezium corresponds to the watercourse bed 12. For static reasons, the upstream face could also alternatively be inclined. The aforesaid minor side of the weir 20 is covered with a slab 21. In the front view of FIG. 1*b*, it may be appreciated better how the lateral walls 15 also have a substantially horizontal, though slightly inclined, top side 15*a*, and a stream side 15*b*, corresponding to the oblique side of the trapezium defined by the weir 20. Extending from the edge 15*c* formed by the top side 15*a* and by the stream side 15*b*, in an upper portion of the weir 20, is a retaining structure represented by a wire netting 17, which is also trapezoidal, but has a height hr smaller than a height hg of the weir 20 so that, defined between the slab 21 and the netting 17, in a lower portion of the weir 20, is an opening 30 having a height a (a=hg−hr). Extending along the major, top, side of the netting 17, from the edges 15*c*, is a rope 16 for engaging the netting 17, which is protected and reinforced, i.e., sized so as to absorb the thrusts applied on the net, in particular the static and dynamic thrust exerted by deposition of material, together with the hydrostatic thrust in the case where the net is more or less clogged. Provided in the wings 15 and embedded in the concrete that forms the aforesaid wings 15 are two anchor bolts 18. In general, the anchor bolts may of course number even more than two. The height a of the opening 30 is, for example, greater than 1 m; however, in the sequel of the present description indications will be provided for sizing the aforesaid height a of the opening 30. Illustrated in FIG. 1*c* is a lateral cross-section of the check dam 10, from which it will be appreciated how the lateral walls 15 have the aforementioned shape of a right trapezium with the upstream side vertical.

Figure 2A:
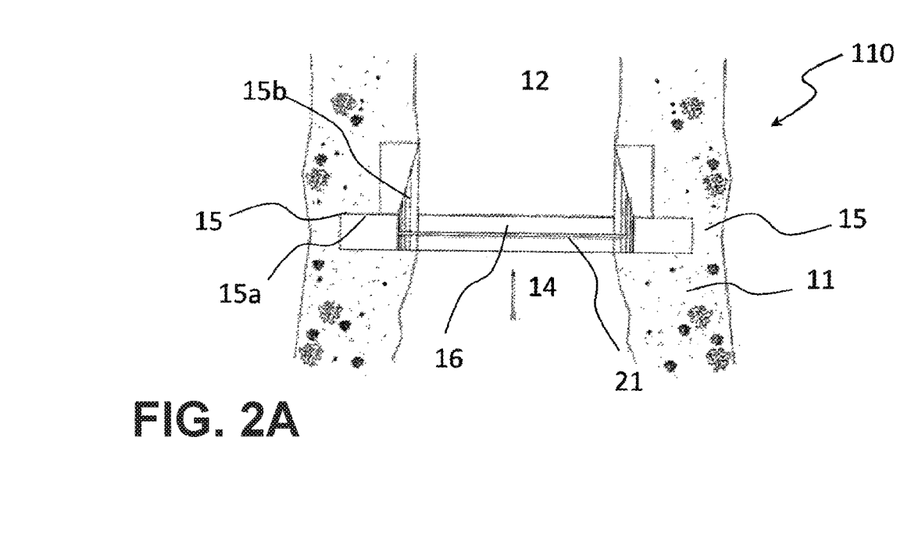
FIGS. 2a, 2b, and 2c are schematic illustrations, viz., a top plan view, a front view, and a cross-sectional view, respectively of a second embodiment of the stream debris-restraining structure according to the invention.
Figure 2B:
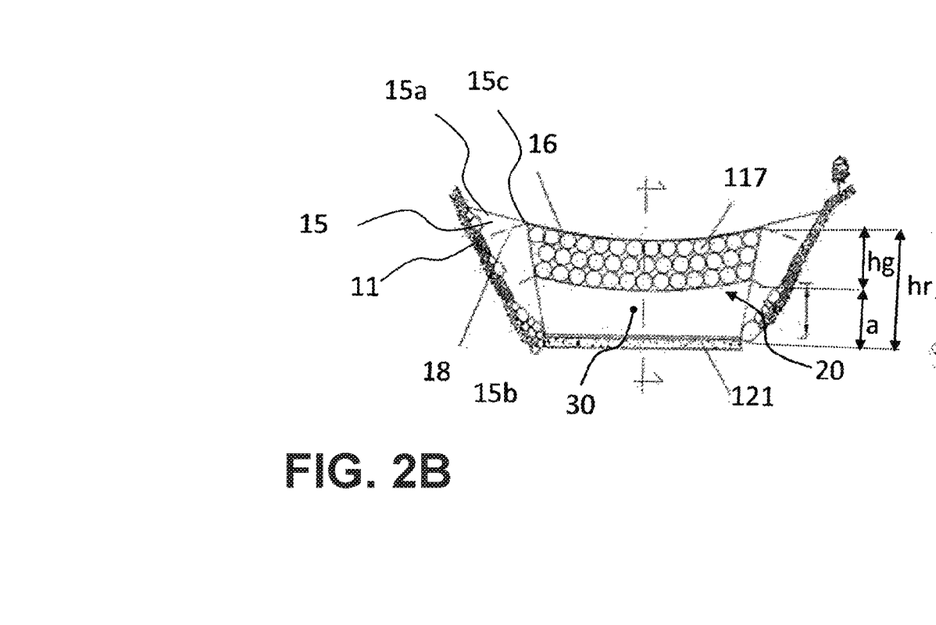
Figure 2C:
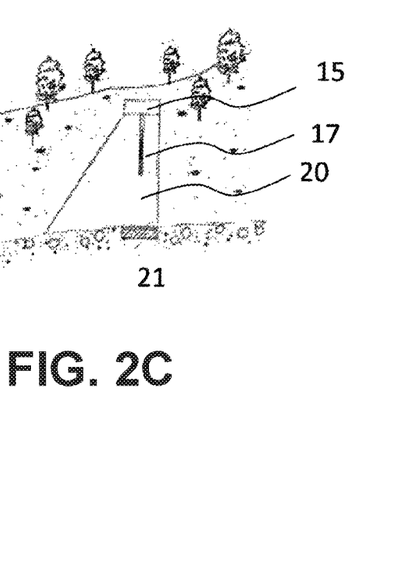

FIGS. 2*a*, 2*b*, and 2*c* illustrate, in top plan view, in front view, and in cross-sectional view, respectively, a full-width check-dam structure 110. In this case, the weir 20 comprises a slab 121 cladded by a steel plate, while an elastic-ring netting 117 is used.

Figure 3A:
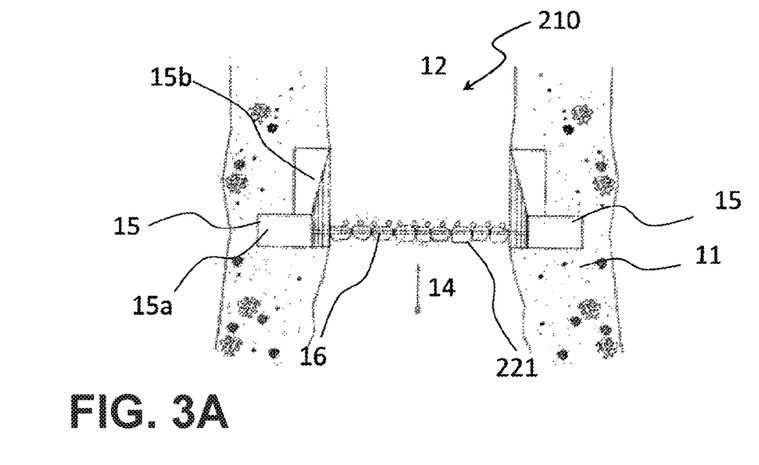
FIGS. 3a, 3b and 3c are schematic illustrations, viz., a top plan view, a front view, and a cross-sectional view, respectively, of a third embodiment of the stream debris-restraining structure according to the invention.
Figure 3B:
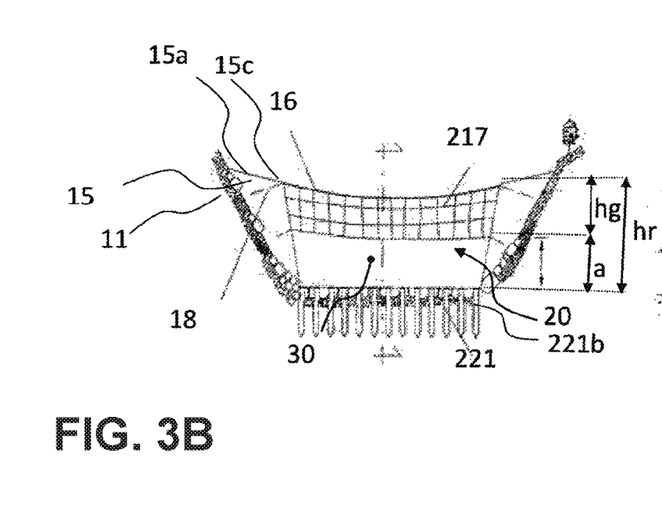
Figure 3C:
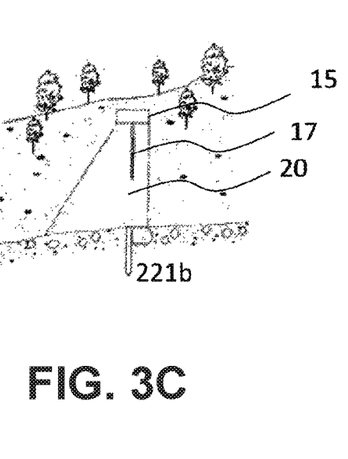
Figure 4A:
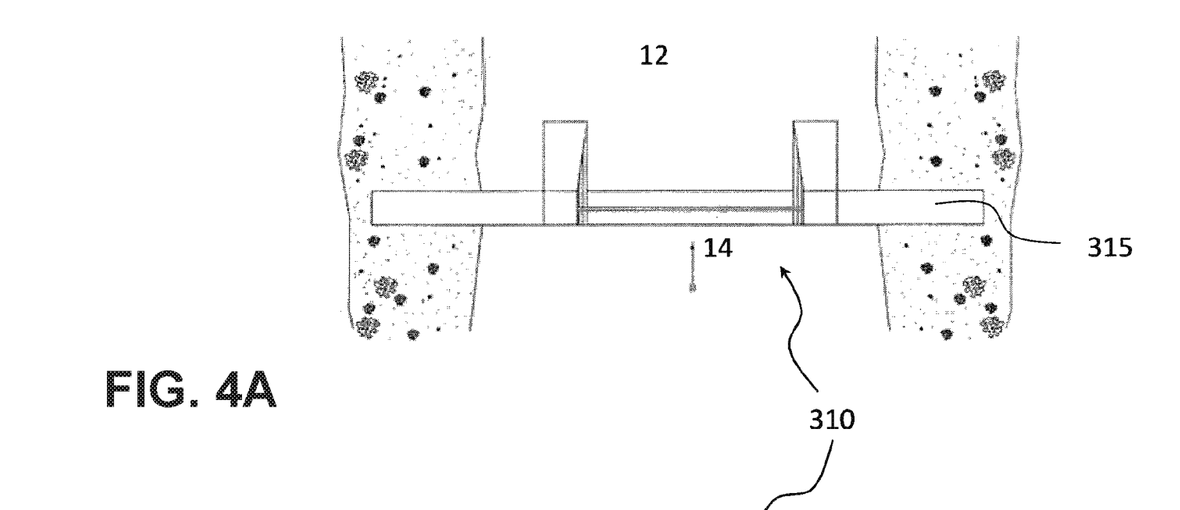
FIGS. 4a, 4b are schematic illustrations, viz., a top plan view and a front view, respectively, of a fourth embodiment of the stream debris-restraining structure according to the invention.
Figure 4B:
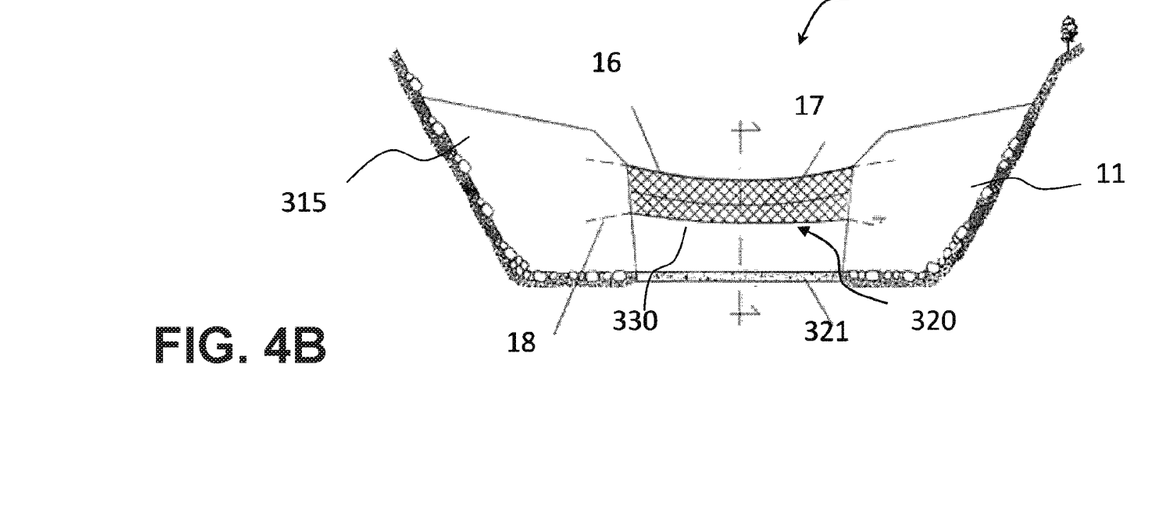

FIGS. 3*a*, 3*b* and 3*c* illustrate, in top plan view, in front view, and in cross-sectional view, respectively, a full-width check-dam structure 210. In this case, a netting 217 made of ropes is used. The weir 20 comprises a slab 221 of rocks or boulders 221*a* reinforced by posts or piles 221*b* driven into the bed:

FIGS. 4, 5, and 6 show in two views, namely, a top plan view and a front view, a variant of a partial-width check-dam structure. Illustrated in FIGS. 4*a* and 4*b* is a structure 310 that comprises extensive lateral walls 315, i.e., walls that extend from the banks of the watercourse 11 as far as into the bed 12, instead of stopping substantially at the limit of the bed 12, thus defining a weir 320, and a corresponding opening 330, that have a width smaller than the width of the bed 12. Extending in the weir 320 is a wire-mesh netting 17.

Figure 5A:
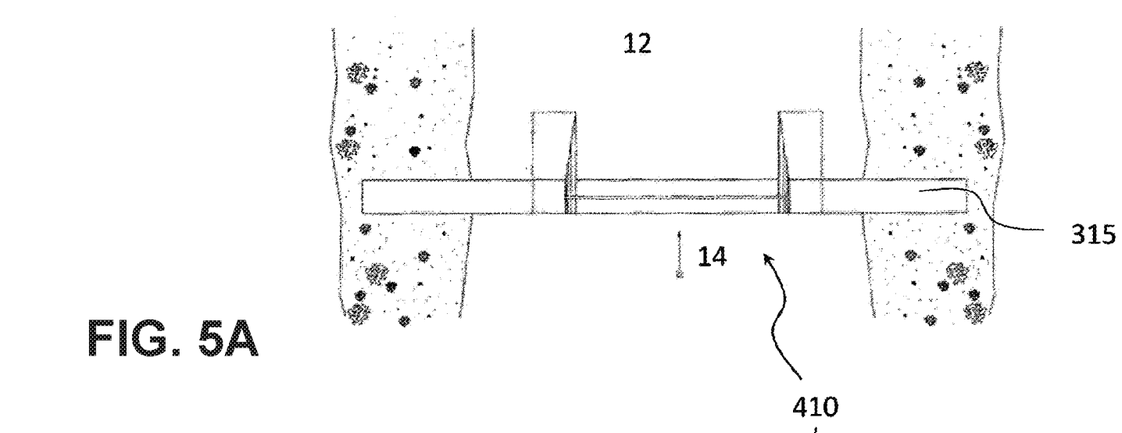
FIGS. 5a, 5b are schematic illustrations, viz., respectively a top plan view and a front view, of a fifth embodiment of the stream debris-restraining structure according to the invention.
Figure 5B:
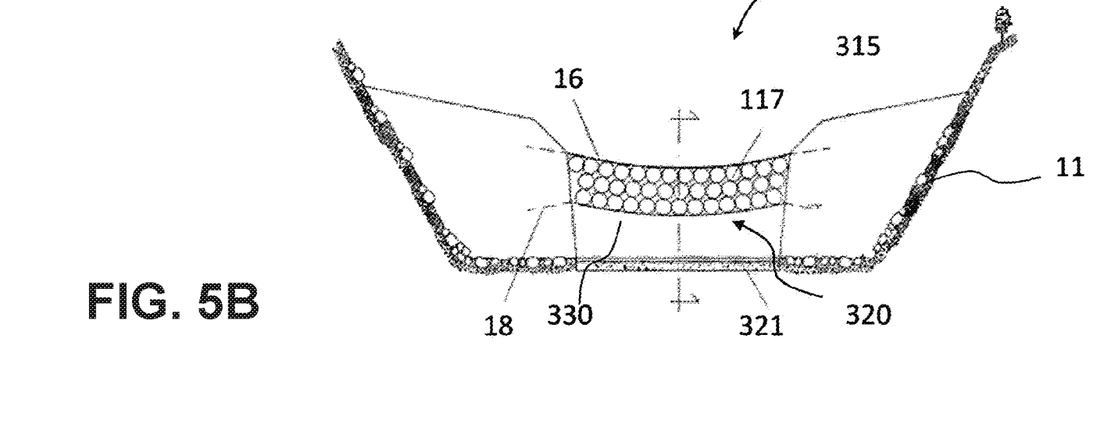

Illustrated in FIGS. 5*a* and 5*b* is a structure 410 with extensive lateral walls 315 and a ring netting 117.

Figure 6A:
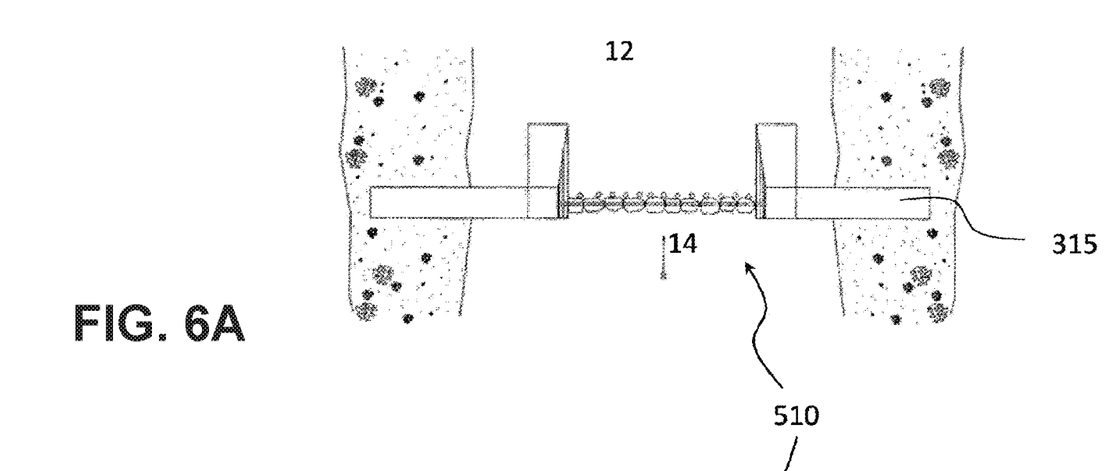
FIGS. 6a, 6b are schematic illustrations, viz., a top plan view and a front view, respectively, of a sixth embodiment of the stream debris-restraining structure according to the invention.
Figure 6B:
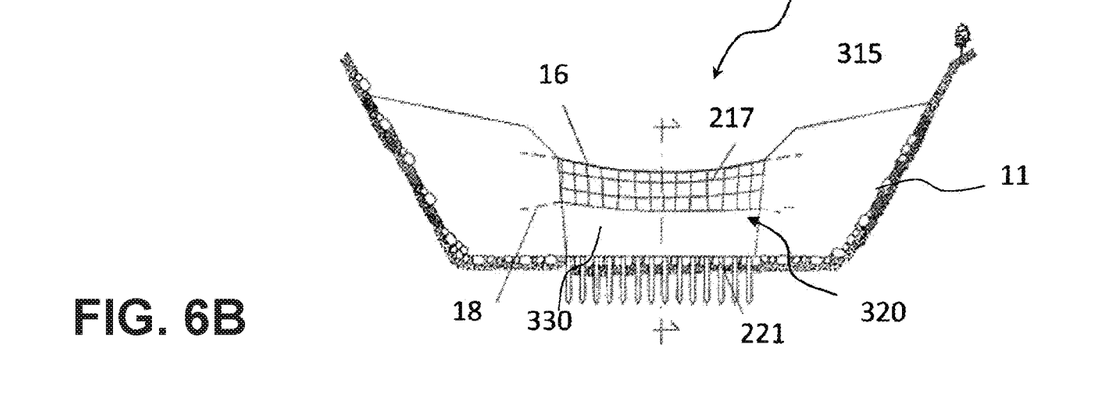

Illustrated in FIGS. 6*a* and 6*b* is a structure 510 with extensive lateral walls 315 and a rope netting 118.

Figure 7:
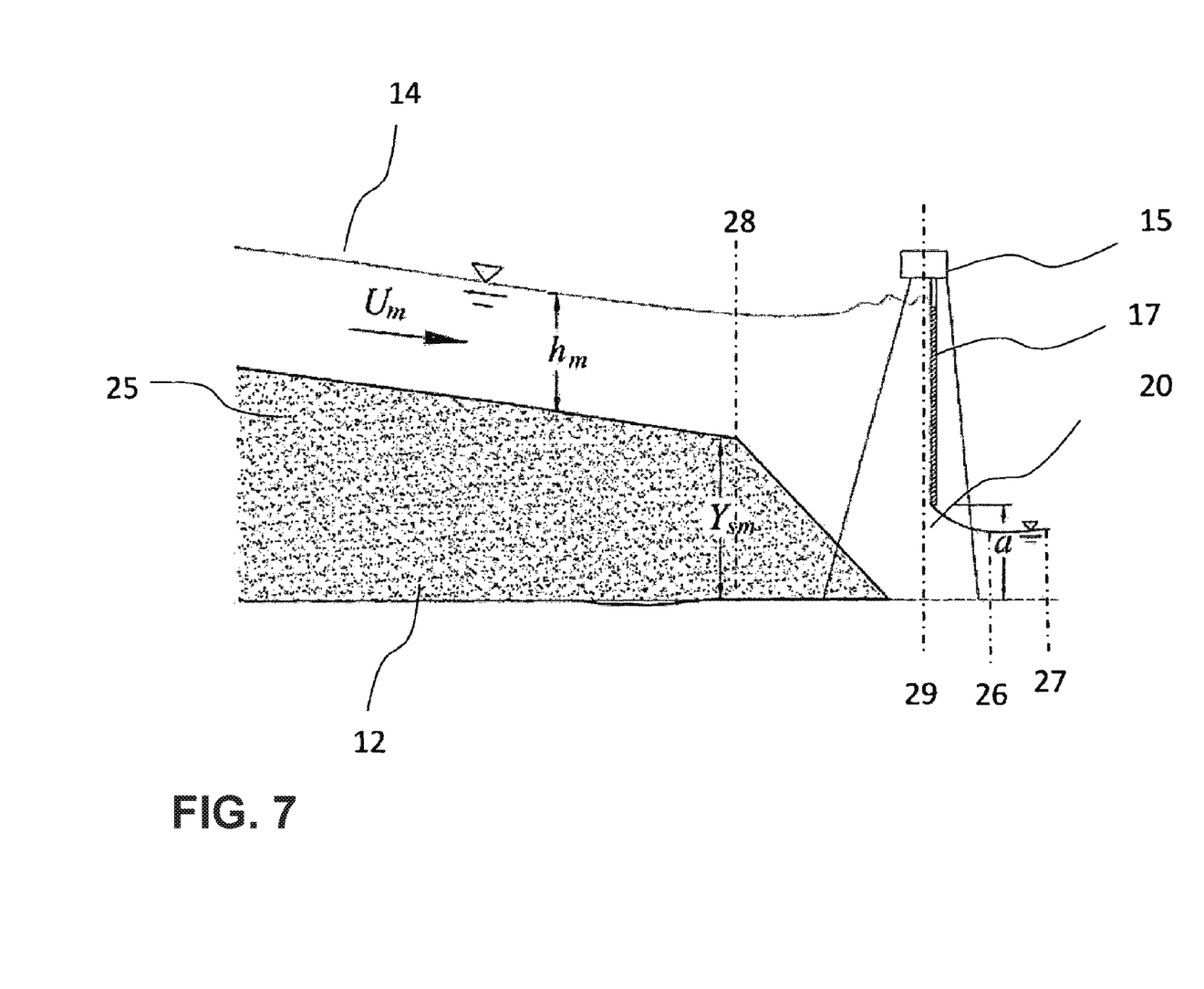
FIG. 7 is a schematic view of a stream debris-restraining structure according to the invention, in which quantities used in the corresponding debris-restraining method are indicated.

The opening 30 (or 330), having a height a, left free underneath the netting 17 of FIG. 1, or 117 and 217 in the other embodiments represented, controls a value of height $Y_{sm}$ of controlled deposit 25 in an upstream section 28 of the check-dam structure 10, as illustrated in FIG. 7.

The height a of the opening 30 can be sized as a function of a height $Y_{sm}$ of the deposit 25 that it is intended to obtain upstream of the check-dam structure 10 in design flood-flow conditions (liquid discharge and solid discharge).

Described in detail in what follows is a procedure of calculation of the value a of the opening 30 that can be used in a stream debris-restraining method that employs a restraining structure according to the invention.

In the above procedure, total clogging of the netting 17 is initially assumed, and the consequent deposit 25 is calculated. In this condition, the netting 17 can be likened to an impermeable plate. It is then shown how the effective permeability of the netting 17 leads in any case to a functional improvement of the check-dam structure according to the invention. The structure according to the invention, as compared to a totally impermeable horizontal-slit check-dam structure, where, instead of the netting 17, 117 or 217 a reinforced-concrete slab or steel plate is present, through the adoption of a partially permeable portion like the one that can be obtained with a net, proves advantageous, not only as regards its cost, but also because the conditions of lamination improve. Without wishing necessarily to be tied down to any specific hypothesis, it is in any case reasonable to assume that in the initial flood phase the netting 17, 117 or 217 will remain free from any material that might clog it so that the amount of deposit is reduced, thus leaving a greater volume free for deposit of debris during the acute phase of the flood in favour of the process of lamination during passage of the flood peak. At the passage of the discharge peak, in the case of debris flow or of hyperconcentrated currents, when the netting 17 is put to the test directly by the front of the debris flow, it is instead reasonable to imagine that the netting 17 will lose its permeability. The degree of clogging may also be determined simply by the amount of floating material that accumulates.

There is thus now calculated the value $Y_{sm}$ of the maximum amount of deposit 25 upstream of the structure 10 in conditions of total clogging of the netting 17, and then it is shown that the value $Y_{sm}$ of the aforesaid deposit is lower if, instead, a part of the liquid flow manages to pass through the netting 17.

It is emphasized that in any case the procedure of sizing of check-dam structures that is described herein may in general be applied also to horizontal-slit check dams built entirely using rigid materials.

As regards the deposit in uniform motion, and hence in the absence of filtration through the netting 17, on the hypothesis that the aforesaid netting 17 is clogged by the material transported, the deposit upstream of a horizontal-slit check dam like the structure 10 can be calculated by imposing the conservation of mass and mechanical energy between a section close to the check-dam structure, where, for the design flow rate, the deposit assumes the maximum value $Y_{sm}$, as illustrated in FIG. 1, and a vena contracta section 26 downstream of the check dam 10. To a first approximation it is fair to assume that the loss of energy between these two sections is negligible.

With reference to the scheme of FIG. 7, indicated in which are the maximum value $Y_{sm}$ of the deposit 25, the upstream velocity of the flow of water 14 $U_m$, and the upstream hydraulic head $h_m$, from the relation of conservation of the liquid mass we have $$h_m U_m = a C_c U_c \qquad (1)$$

where $U_c$ is the velocity of the flow of water in the vena contracta section 26 downstream of the check dam 10, and $C_c$ is a contraction coefficient of the vena contracta section 26.

From the conservation of mechanical energy we then have $$Y_{sm} + h_m + \frac{U_m^2}{2g} = a C_c + \frac{U_c^2}{2g} \qquad (2)$$

Combining the two equations (1) and (2) we obtain the following dimensionless relation $$\frac{Y_{sm}}{h_m} = \frac{F_m^2}{2}\left(\left(\frac{h_m}{aC_c}\right)^2 - 1\right) + \frac{aC_c}{h_m} - 1 \qquad (3)$$

$F_m$ is the Froude number of the current arriving; i.e., $F_m = U_m/\sqrt{gh_m}$.

From the above Eq. (3) it emerges that the value a of the height of the opening is a function of a relative value of maximum deposit $Y_{sm}$ upstream of the check dam. In actual fact Eq. (3) expresses the dimensionless ratio $$\frac{Y_{sm}}{h_m}$$

between the value of maximum deposit $Y_{sm}$ and hydraulic head $h_m$ as a function of a. The value a of height of the opening according to Eq. (3) is represented by a function that comprises as parameters also the contraction coefficient $C_c$.

Figure 8:
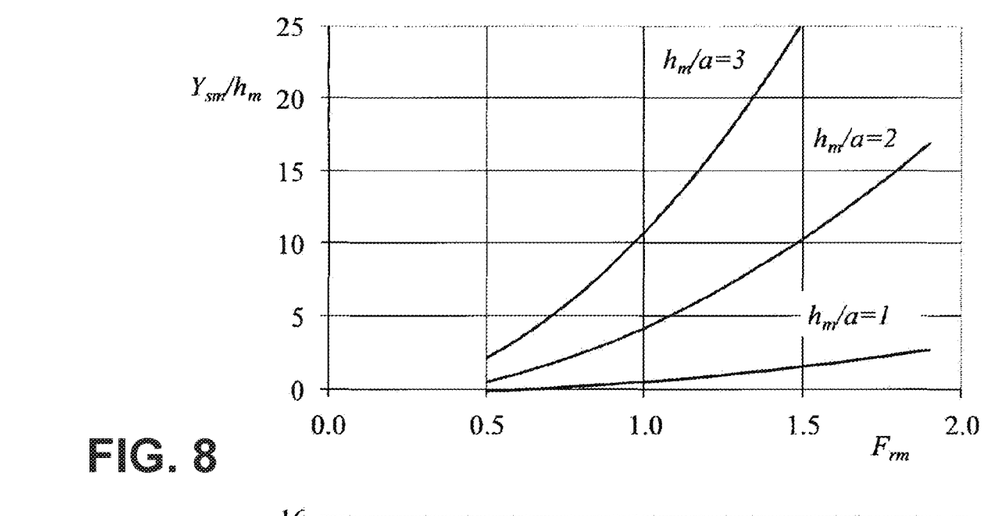
FIGS. 8, 9, and 10 are diagrams representing the restraining capacity of the structure according to the invention in different embodiments and conditions of flow.

A representation of Eq. (3) is provided in the diagram of FIG. 8, which shows in dimensionless form the variation of the relative maximum deposit $Y_{sm}$, i.e., the ratio $$\frac{Y_{sm}}{h_m},$$

upstream of the check dam as a function of the Froude number of the current arriving $F_m$ for different values of the degree of opening, expressed as ratio between the hydraulic head $h_m$ and the height a of the opening of the check-dam structure 10, in this case on the hypothesis of total clogging of the netting 17 and of conservation of energy. The height a of the opening is consequently the height at which the bottom edge of the netting 17 must be set to obtain a given maximum value $Y_{sm}$ of deposit 25 upstream of the check dam 10. Given the maximum height $Y_{sm}$ of deposit 25 and a slope $i_m$ of the bed 12 during the flood peak with the deposit, from simple geometrical considerations it is possible to calculate the laminated solid volume during passage of the flood, as explained hereinafter. It should be noted that in the figures the height a of the opening 30 (or 330) is indicated as measured on the side of the weir 20 (or 320); however, as has been said, an optimal evaluation of the aforesaid height a must be associated to the bottom edge of the net.

In the area between the end of the deposit 25 and the section 29 of the check-dam structure 10 there is in general set up a secondary circulation typical of situations of sudden widening, as has also been observed in the laboratory. This circulation causes enormous dissipative phenomena that can alter the amount of the deposit.

The grounds of the above hypothesis of conservation of mechanical energy in relation to the calculation of the height of the deposit set forth previously are now evaluated, and, in the case where the hypothesis is not sufficiently conservative, this evaluation, by taking into account the dissipative phenomena, enables correction of the amount of the deposit estimated previously applying Eq. (3).

The loss of energy $\Delta E_B$ can be calculated by likening it to that of a Borda effect for sudden widening $$\frac{\Delta E_B}{h_m} = \frac{(U_m - U_b)^2}{2gh_m} \quad (4)$$

where $U_b$ is the average velocity in the section 29 upstream of the check dam 10. Entering the continuity equation (1) into Eq. (4), we obtain $$\frac{\Delta E_B}{h_m} = \frac{F_m^2}{2}\left(\frac{Y_{sm}}{h_m + Y_{sm}}\right)^2 \quad (5)$$

where, to a first approximation, there has been assumed as average velocity $U_b$ in the section 27 immediately behind the check dam 10, the value that derives from the continuity equation $$U_b = q/(h_m + Y_{sm}) \quad (6)$$

In order to bring out the amount of the deposit 25, also in this case a good approximation of Eq. (5) may be obtained from the following relation:

$$\frac{\Delta E_B}{h_m} \cong \frac{F_m^2}{2}\frac{Y_{sm}/h_m}{2 + Y_{sm}/h_m} \quad (7)$$

Now, the calculation of the height of the deposit is evaluated, taking into account the loss of energy. The loss of energy previously estimated in Eq. (7) must be entered into the energy-balance equation. Combining the two equations, it is obtained:

$$\frac{Y_{sm}}{h_m} + 1 + \frac{U_m^2}{2gh_m} - \frac{\Delta E_B}{h_m} = \frac{aC_c}{h_m} + \frac{U_c^2}{2gh_m} \quad (8)$$

Developing Eq. (8) as was done previously using Eq. (7), it is obtained:

$$\frac{Y_{sm}}{h_m} = \frac{Y'_{sm}}{h_m} + \frac{F_m^2}{2}\frac{Y_{sm}/h_m}{2 + Y_{sm}/h_m} \quad (9)$$

where it is set $$\frac{Y'_{sm}}{h_m} = \frac{aC_c}{h_m} + \frac{F_m^2}{2}\left(\frac{h_m}{aC_c}\right)^2 - 1 - \frac{F_m^2}{2} \quad (10)$$

which corresponds to the value $Y'_{sm}$ of deposit that there would be in conditions of energy conservation. We thus obtain $$\left(\frac{Y_{sm}}{h_m}\right) + \frac{Y_{sm}}{h_m}\left(2 - \frac{Y'_{sm}}{h_m} - \frac{F_m^2}{2}\right) - 2\frac{Y'_{sm}}{h_m} = 0 \quad (11)$$

Solving Eq. (11), hence it is obtained $$\frac{Y_{sm}}{h_m} = -\left(1 - \frac{Y'_{sm}}{2h_m} - \frac{F_m^2}{4}\right) \pm \sqrt{\left(1 - \frac{Y'_{sm}}{2h_m} - \frac{F_m^2}{4}\right)^2 + 2\frac{Y'_{sm}}{h_m}} \quad (12)$$

Only the solution with the negative sign in front of the square root has a physical sense. Furthermore, if we neglect the term $F_m^2/4$, the solution coincides, as is to be expected, with the one obtained using the hypothesis of energy conservation.

Figure 9:
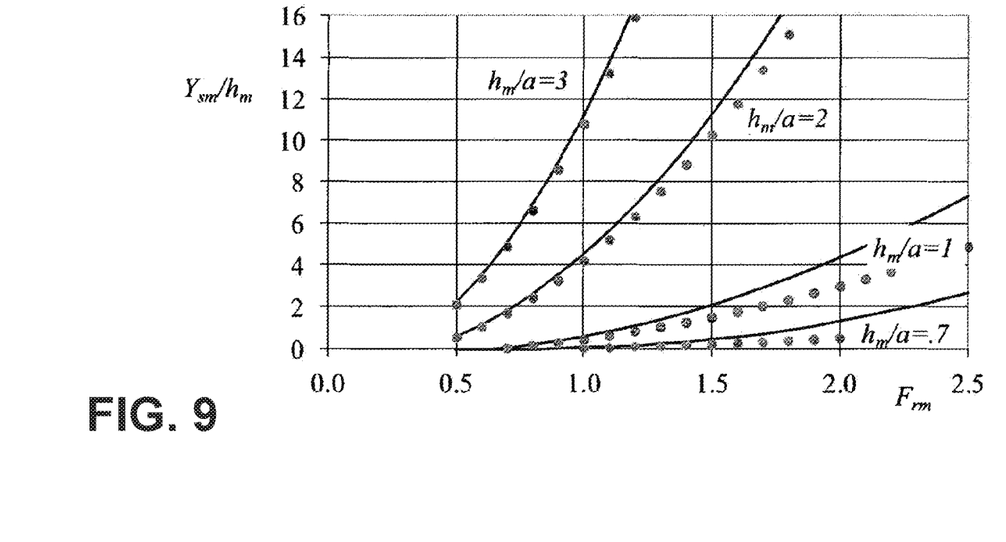

From the diagram of FIG. 9, which shows the plot of the relative maximum deposit $Y_{sm}$ upstream of the check dam as a function of the Froude number of the current arriving $F_m$, on the hypothesis of total clogging of the netting 17, on the hypothesis of energy conservation (dots), and on the hypothesis of energy loss (solid lines), it may be noted that introduction into the energy-balance equation of the dissipation induced by the vortex behind the check dam 10 is not important and that, to a fair approximation, the corresponding energy loss can be neglected.

In the sequel of the present description, there is also provided an indication of how to calculate the parameters of hydraulic head $h_m$ and upstream velocity $U_m$ as a function of the design liquid discharge (in peak-flood condisions) and of the solid discharge.

The effect of the netting 17 (or 117 or 217) is now evaluated. Previously, a criterion has in fact been illustrated for calculating the deposit (and hence the laminated solid volume) on the hypothesis that the netting 17 is completely impermeable. The aim now is to show how it is possible to use the criterion proposed also on the hypothesis where the netting 17 is permeable, as in effect it is in the solution according to the invention.

With the netting 17 clogged, the behaviour of the check dam is the one described above. If the net check-dam structure is used in the presence of vegetal material, a condition in which the use of the net is preferable, or in the presence of material having a grain-size curve with a fair percentage of sediment comprised between 0.75 $D_M$ and 0.50 $D_M$, where $D_M$ is the average size of the holes of the netting 17, it is convenent for reasons of safety to assume the sizing criterion whereby total clogging of the netting 17 is hypothesized.

If it is assumed, instead, that the netting 17 is altogether clean, it is possible to apply again the criterion described previously, simply using a contraction coefficient $C_c$ greater than 0.61. By adopting, for example, $C_c$ equal to 0.73 it is assumed that 20% of the liquid discharge passes through the netting 17. Obviously, it is possible to hypothesize also higher values of the contraction coefficient $C_c$, even though it does not seem wise to increase this value by more than 20-30%.

Figure 10:
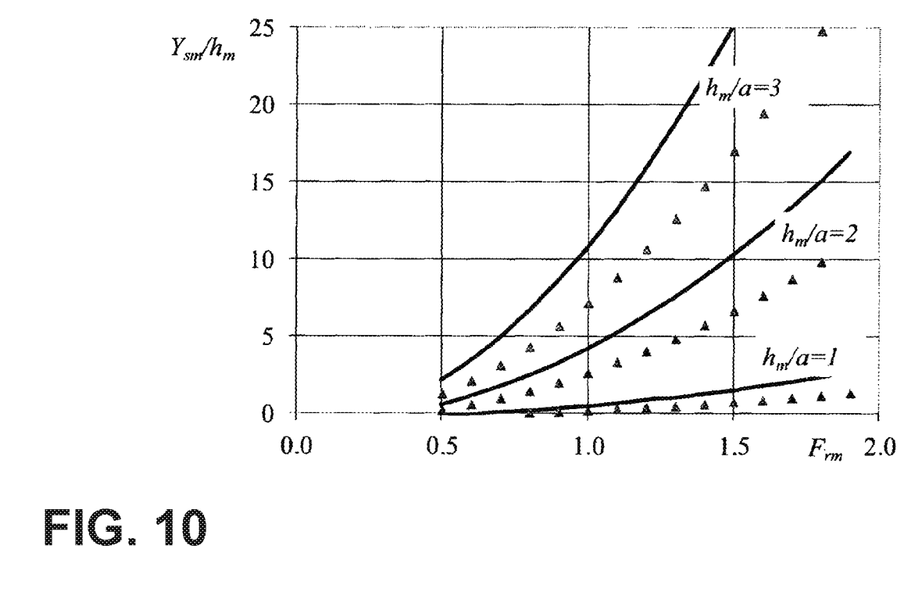

The diagram of the relative maximum deposit $Y_{sm}$ upstream of the check dam as a function of the Froude number $F_m$ of the current arriving, on the hypothesis of partially permeable netting, and specifically on the hypothesis that 20% of the discharge manages to filter through the netting, is represented in FIG. 10 (triangles) and compared with the deposit in the absence of filtration (solid lines).

From FIG. 10 it may be noted how, in the absence of clogging of the netting 17, as may be expected, given the same Froude number $F_m$, the deposit upstream is less than with the netting clogged. Since clogging in general develops in conditions of higher hydraulic heads, i.e., in concomitance with the passage of the flood crest, the effect of lamination of the solid discharge will be more effective in so far as the first part of the flood can pass through, leaving the volume upstream in the check dam free. As has been said, the netting 17 can be stretched either over the entire width of the check dam (embodiments of FIGS. 1, 2, 3) or over only part of the width (embodiments of FIGS. 4, 5, 6), combining in this latter case the effects of the horizontal-slit check dam provided with netting that are described herein with those of vertical-slit check dams, as is described, for example, in Armanini, A., Larcher, M., "Rational criterion for designing opening of slit-check dam", Journal of hydraulic engineering, 2001, vol. 127, No. 2, p. 94-104, or in Armanini, A., Fraccarollo, L., Larcher, M., 2005 b), "Debris Flow", Chap. 142, in Anderson, M. G. (Ed.), Encyclopedia of Hydrological Sciences, vol. 4. Hoboken, N.J., Chichester, Wiley, 2173-2185.

There is now illustrated a possible procedure for calculation of the conditions upstream as a function of the liquid discharge and solid discharge, i.e., for calculation of the parameters for the hydraulic head $h_m$ and the velocity $U_m$ of the flow upstream that appear in the foregoing relations as a function of the liquid discharge and solid discharge of the arriving flow in such a way that the criterion set forth above can be used as design criterion as a function of the boundary conditions, which are precisely these two discharges.

On the hypothesis of the watercourse 11 being involved by bedload transport, the hydraulic head $h_m$ and the velocity $U_m$ may be calculated using a uniform-flow formula and a solid-transport formula. We shall adopt, by way of example, the Gauckler-Strickler formula for uniform flow and the Meyer-Peter and Müller formula for solid transport, which cover almost all torrent situations in the absence of mass transport, as follows:

Gauckler-Strickler uniform-flow formula, on the hypothesis of wide rectangular channel and hydraulically rough wall:

$$\frac{U_m}{u_{*-m}} = 6.74 \left(\frac{h_m}{d_{50}}\right)^{1/6} \quad (13)$$

where $u_{*-m}$ is the friction velocity in the stretch above the deposit 25, and $d_{50}$ is the median value of the grain-size distribution of the transported material;

Meyer-Peter and Müller bedload-transport formula:

$$q_s = d_{50}\sqrt{g\Delta d_{50}}\, 8 \left(\frac{u_{*-m}^2}{g\Delta d_{50}} - \theta_c\right)^{3/2} \quad (14)$$

where: $q_s$ is the solid discharge per unit width; $\Delta = (\rho_s - \rho)/\rho$ is the mean relative submerged density of the material that makes up the sediment; and $\theta_c$ is the critical Shields parameter, which in the case of rough wall may be assumed as equal to 0.056

Combining Eqs. (13) and (14), after a few passages we obtain $$\left[\frac{q_s}{d_{50}\sqrt{g\Delta d_{50}}\, 8}\right]^{2/3} + \theta_c = \frac{q^2}{g\Delta d_{50}^3}\frac{1}{(6.72)^2}\left[\frac{d_{50}}{h_m}\right]^{7/3}$$

i.e., for the hydraulic head upstream $h_m$ $$h_m = d_{50}\left[\frac{1}{(6.72)^2}\frac{q^2}{g\Delta d_{50}^3}\frac{1}{\left[\frac{q_s}{d_{50}\sqrt{g\Delta d_{50}}\, 8}\right]^{2/3} + \theta_c}\right]^{7/3} \quad (15)$$

and for the velocity $U_m$ of the flow 14 upstream, we obtain $$U_m = \frac{q}{h_m} \quad (16)$$

The slope $i_m$ of the new bed above the deposit 25 is hence given by $$i_m = \frac{u_{*-m}^2}{gh_m} \quad (17)$$

where the friction velocity $u_{*-m}$ may be calculated using Eqs. (13), (15) and (16). That is, if we express the slope $i_m$ directly as a function of the hydraulic head $h_m$ and of the velocity $U_m$, we have $$\begin{aligned} i_m &= \frac{U_m^2}{gh_m}\frac{u_{*-m}^2}{U_m^2} \\ &= \frac{U_m^2}{gh_m}\frac{1}{6.74^2}\left(\frac{d_{50}}{h_m}\right)^{1/3}. \end{aligned} \quad (18)$$

It should be noted that the model of lamination of the solid discharge proposed herein and the model of deposition induced by the horizontal slit and by the netting can be extended also to debris flows, with even greater advantages. The mechanism of hydrodynamic selection described previously functions well also in the presence of debris flows and mudflows, a situation in which the check-dam structure proposed finds its most useful application.

In this case, it will be sufficient to modify the transport and uniform-flow relations (Eqs. 13 to 18) with the analogous relations that apply to debris flows. In the case of debris flows, however, it would appear reasonable to assume total clogging of the netting during the entire flood event. In the case of debris flows, moreover, the netting may be sized to withstand any dynamic impact, according to the criteria known in the art, for example set forth in the already cited paper by Armanini, A., Fraccarollo, L., and M. Larcher (2005).

Hence, from the foregoing description the characteristics and advantages of the invention emerge clearly.

Of course, the details of construction and the embodiments may vary widely with respect to what has been described and illustrated herein, without thereby departing from the sphere of protection of the present invention, as defined of the annexed claims.

The restraining structure according to the invention advantageously allows passage of the initial part of the solid discharge, bestowing on an array of these structures built in succession along the watercourse an effective lamination capacity.

Furthermore, the restraining structure according to the invention advantageously enables a greater self-cleaning capacity (which is absent in traditional net check dams) as compared to rigid vertical-slit check dams. In fact, the horizontal opening considerably reduces the possibility of clogging.

In addition, the restraining structure according to the invention advantageously enables reduction of the construction costs and times. In particular, in this regard, the use of a net is particularly advantageous as compared to the adoption of other elements for delimiting the flow section at the top, such as for example a beam. The net, which is easy to install, reduces costs, including installation costs.

In this regard, even though the preferred embodiment uses a mesh or reticular structure as retaining structure occupying the upper portion of the flow section, also a retaining structure using an impermeable beam, for example a reinforced-concrete slab or a steel plate, can achieve lamination of the solid discharge, as illustrated previously with reference to Eqs. (1)-(3).

An important variant of the restraining structure according to the invention comprises inclining in a downstream direction, for example by an angle comprised between 10° and 30° with respect to the vertical, the netting that delimits the opening, in order to favour progressive displacement upwards of the floating material, preventing it from clogging the horizontal slit.

According to a further variant, in addition to the full-width and partial-width check-dam embodiments, the restriction of the flow section of the check dam may involve only the lower portion of the weir; i.e., the bottom opening is of the partial-width type, whereas the upper portion of the check dam, where the netting operates, is of the full-width type.

The invention claimed is:

1. A method for restraining debris in a stream, said method comprising providing a restraining structure comprising lateral walls which define wings extending from banks of the stream inwards and which delimit between them a flow section comprised in a bed of said stream, wherein said flow section includes an upper portion comprising a restraining structure, set between said lateral walls, for retaining material arriving from upstream and a lower portion defining a horizontal slit for outflow, the horizontal slit having a predetermined height between a bottom edge of the retaining structure and the stream bed, wherein the structure exerts an effect of lamination during a flood peak, wherein said predetermined height is selected as a function of a given maximum value of deposit upstream of the structure.

2. A structure for restraining debris in a stream comprising banks, the structure comprising lateral walls which define wings extending from the banks of the stream inwards and delimiting between them a flow section comprised in a bed of said stream, wherein said flow section includes an upper portion comprising a retaining structure, set between said lateral walls, for retaining material arriving from upstream and a lower portion defining a horizontal opening for outflow, the horizontal opening having a predetermined height between a bottom edge of the retaining structure and the stream bed, wherein the structure exerts an effect of lamination during a flood peak, wherein said predetermined height is selected as a function of a given maximum value of deposit upstream of the structure.

3. The structure according to claim 2, wherein said retaining structure comprises a reticular structure.

4. The structure according to claim 3, wherein said reticular structure comprises a metal wire net.

5. The structure according to claim 3, wherein said reticular structure comprises elastic rings.

6. The structure according to claim 3, wherein said reticular structure comprises a net of ropes.

7. The structure according to claim 2, wherein said lateral walls delimit said flow section extending the flow section to an entire width of the bed of the stream.

8. The structure according to claim 2, wherein said lateral walls extend in the bed of the stream and delimit said flow section limiting the flow section to a partial width of said bed.

9. The structure according to claim 2, wherein said flow section is delimited at a bottom thereof by a slab.

10. The structure according to claim 9, wherein said slab and/or flow section are made of concrete or steel-cladded concrete or with bound rocks or boulders.

11. The structure according to claim 2, wherein said retaining structure is inclined in a downstream direction by an angle of between 10° and 30°.

12. The structure according to claim 2, wherein the lateral walls are non-permeable.

13. The structure according to claim 2, wherein the lateral walls have a different structure than the upper portion of the flow section.

14. The structure according to claim 2, wherein the horizontal slit extends an entire distance between the lateral walls and has a periphery bound on three sides by the lateral walls and the upper portion of the flow section.

15. The structure according to claim 2, wherein the retaining structure is at least partially permeable.

* * * * *

UNITED STATES PATENT AND TRADEMARK OFFICE
CERTIFICATE OF CORRECTION

PATENT NO. : 10,767,330 B2
APPLICATION NO. : 16/045124
DATED : September 8, 2020
INVENTOR(S) : Aronne Armanini Page 1 of 1

It is certified that error appears in the above-identified patent and that said Letters Patent is hereby corrected as shown below:

On the Title Page

Please amend item (30) as follows:
--(30) Foreign Application Priority Data
Mar. 15, 2013 (IT)........TO2013A000200--

Signed and Sealed this
Twenty-second Day of December, 2020

Andrei Iancu
*Director of the United States Patent and Trademark Office*